United States Patent [19]

Fukuju et al.

[11] Patent Number: 4,586,093
[45] Date of Patent: Apr. 29, 1986

[54] METHOD AND APPARATUS FOR SYNCHRONIZING PLAYBACK OF TAPES RECORDED IN DIFFERENT FORMATS

[75] Inventors: Yukio Fukuju, Yokohama; Makoto Niiro, Sagamihar, both of Japan

[73] Assignee: Sony Corporation, Tokyo, Japan

[21] Appl. No.: 515,853

[22] Filed: Jul. 21, 1983

[51] Int. Cl.⁴ .................. G11B 15/52; G11B 27/19
[52] U.S. Cl. .................................. 360/73; 360/72.2; 360/48
[58] Field of Search .................. 360/13, 14.1, 14.2, 360/14.3, 22, 23, 26, 73, 72.2, 27, 28, 48, 49; 318/85, 310, 311, 314; 369/32, 33, 41, 50

[56] References Cited

U.S. PATENT DOCUMENTS

| | | | |
|---|---|---|---|
| 3,441,342 | 4/1969 | Ball et al. | 360/73 |
| 3,789,159 | 1/1974 | Feit et al. | 360/73 |
| 3,911,488 | 10/1975 | Wood et al. | 360/73 |
| 4,067,049 | 1/1978 | Kelly et al. | 360/14.3 |
| 4,210,939 | 7/1980 | Ninomiya et al. | 360/14.3 |
| 4,389,681 | 6/1983 | Tanaka et al. | 360/48 |
| 4,466,029 | 8/1984 | Tanaka | 360/13 |

Primary Examiner—Raymond F. Cardillo
Assistant Examiner—Steven R. Garland
Attorney, Agent, or Firm—Lewis H. Eslinger; Alvin Sinderbrand

[57] ABSTRACT

An addressing method permits the synchronized reproduction of digitized information recorded on different tapes in different formats, each of which uses a different number of data tracks for each channel of analog information. A first tape uses one track per analog channel. On a second tape each channel is recorded simultaneously in four tracks at one-fourth of the recording speed of the first tape. The data on both tapes is arranged in data blocks that occupy same amount of space. Both tapes have sector intervals occupying a space corresponding to four data blocks, and each sector interval has an associated sector address. On the first tape, the sector addresses in successive intervals are incremented by one, while on the second tape the successive sector addresses are incremented by four. Thus, the data on both tapes can be reproduced in synchronization at their respective recording speeds by maintaining the difference between the sector addresses on the two tapes constant. An apparatus for maintaining synchronized reproduction of two such tapes uses two tape recorders, each of which provides the sector addresses reproduced from the tapes to a subtraction circuit. The digital output of the subtraction circuit represents, in both sense and magnitude, the extent to which synchronization of the playback of the tapes has been lost. A digital-to-analog converter converts the subtraction circuit output into an error signal for controlling the speed of one of the tape recorders.

18 Claims, 12 Drawing Figures

FIG. 1A
FIG. 1B
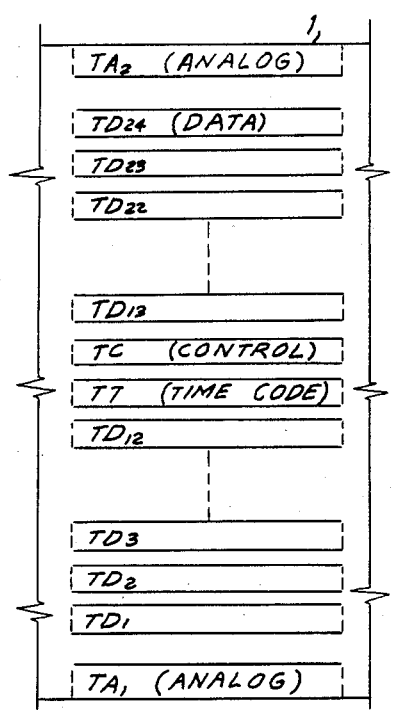
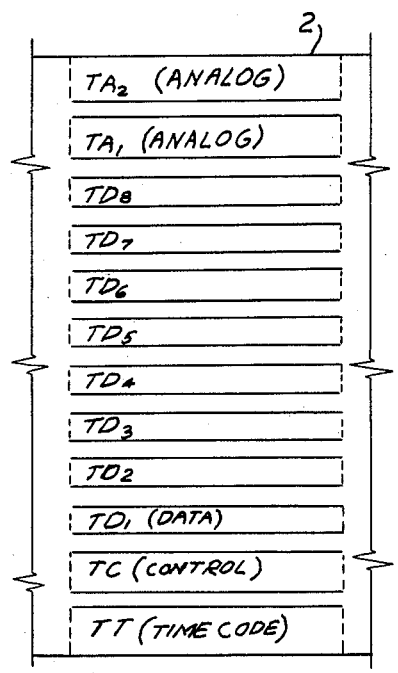

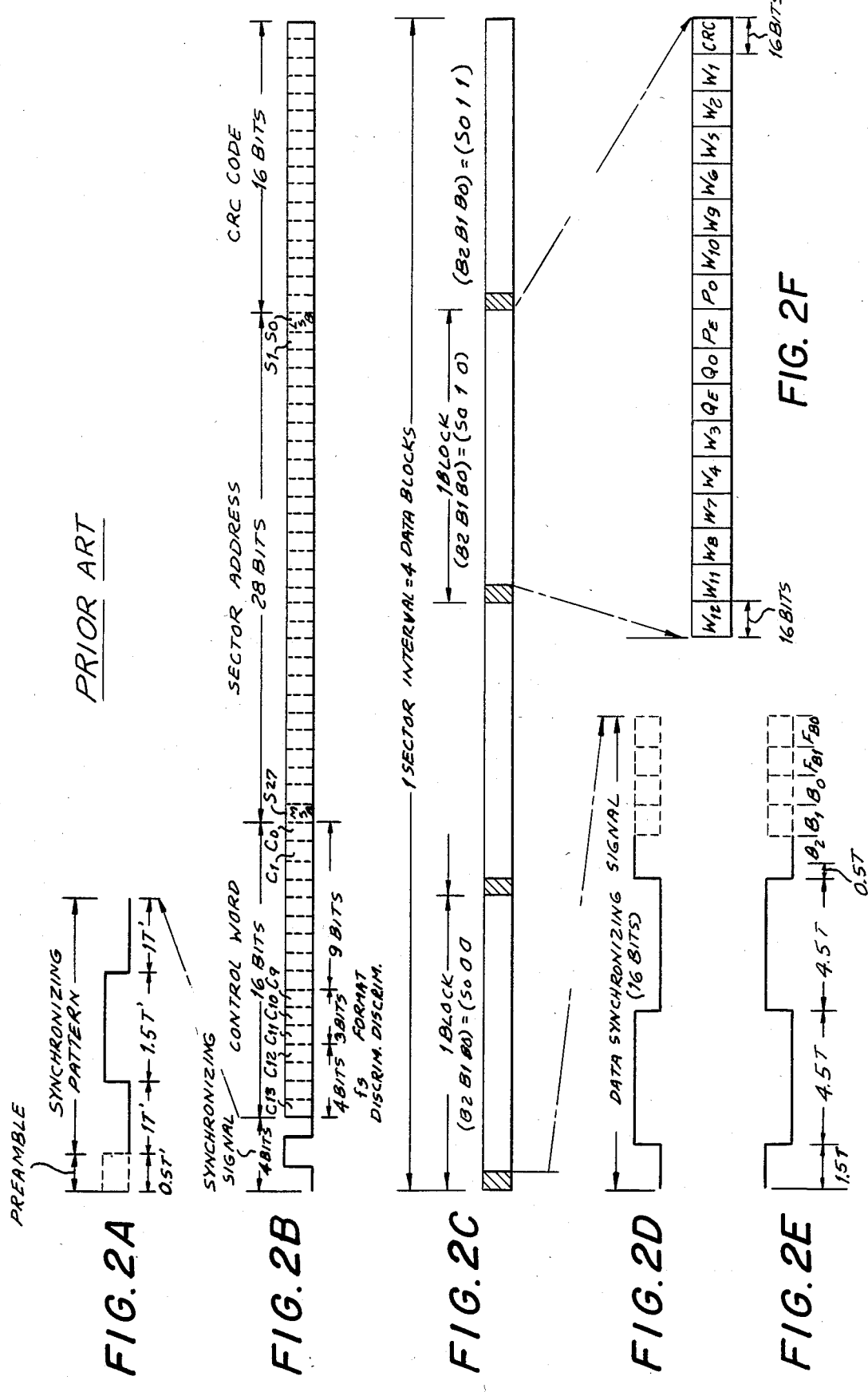

METHOD AND APPARATUS FOR SYNCHRONIZING PLAYBACK OF TAPES RECORDED IN DIFFERENT FORMATS

BACKGROUND OF THE INVENTION

1. Field of the Invention

The present invention relates to the reproduction of information from recording mediums having address signals thereon and, more particularly, to providing address signals that can be used to synchronize the playback of recording mediums recorded in different formats.

2. Description of the Prior Art

Techniques for recording analog information, such as audio signals, in digital form on various recording mediums are well known. For example, in pulse code modulation, or PCM, the analog signal is sampled at a particular sampling frequency and to each sample a value is assigned that is representative of the magnitude of the analog signal at that particular time. Those values are converted to digital data and recorded on a recording medium. With the familiar longitudinally extending magnetic tape, there are various PCM recording formats. A typical variant between formats is the number of data tracks per analog signal channel. For example, in one format the digital information might be recorded in one track on the tape comprising a series of data blocks consecutively arranged on the tape. In another format the tape could have four parallel, adjacent tracks per channel.

Different formats used for PCM recording are shown in detail in U.S. patent application Ser. No. 286,963, filed July 27, 1981, now U.S. Pat. No. 4,389,681, issued June 21, 1983, and assigned to the assignee of the present invention. As that application shows, a one track/analog channel format arranges the digital information into uniform data blocks and simply records them one after the other on a tape passing a magnetic recording head. The four track/analog channel format records the digital data, arranged in similar data blocks, simultaneously in four adjacent data blocks. The advantages of that particular arrangement are discussed in the patent application cited above.

Another feature of digital recording is the ability to provide convenient retrieval of information on the tape. Each consecutive group, or sector, of data blocks is given a digital address and, by incrementing each sector address as the signal is recorded, any particular group of data blocks can be found by searching for its assigned address.

In the above-cited patent application, the sector addresses are incremented by a predetermined amount regardless of format. However, that complicates the synchronization of the playback of two tapes recorded in different formats because the playback speeds, which correspond to the respective recording speeds, are different. In the example given above, the sector addresses of the tape recorded in the one track/channel format increase four times as fast as those of the tape recorded in the four track per channel format, and a synchronization circuit would be extremely complex.

SUMMARY OF THE INVENTION

It is therefore an object of the present invention to overcome the above-described disadvantages in prior art addressing schemes and thus provide for simpler synchronization of the playback of two recording mediums recorded in different formats.

It is another object of the present invention to provide a method of addressing at least two recording mediums.

It is a further object of the present invention to provide a method of synchronizing the reproduction of information from at least two recording mediums having information recorded thereon in different formats.

It is yet another object of the present invention to provide apparatus for synchronizing the reproduction of information recorded on at least two recording mediums in different formats.

In accordance with an aspect of the present invention, synchronized reproduction of information from at least two recording mediums is provided for by having information recorded thereon in sequentially arranged blocks occupying a predetermined amount of space L on both mediums, the second medium having an integral number N times as many tracks as the first medium in which information has been recorded and from which information is to be reproduced at a speed 1/N times as fast as reproduction from the first medium. The first and second mediums are provided with pluralities of first and second sequentially arranged sectors, respectively, each sector occupying an amount of space substantially equal to an integral multiple of L. A first sector address assigned to each first sector has a value different from the adjacent first sector address by a predetermined amount I and a second sector address provided for each second sector has a value different from the adjacent second sector address by an amount N times I. The reproduction of information from the two mediums is synchronized by maintaining constant the difference between the first and second sector addresses by adjusting the playback speed of at least one of the recording mediums.

The above and other objects, features and advantages of the present invention will become clear when considering the detailed description of an illustrative embodiment set out below in connection with the drawings.

BRIEF DESCRIPTION OF THE DRAWINGS

FIGS. 1A and 1B illustrate magnetic tapes on which information can be recorded in two different formats, respectively;

FIGS. 2A-2F illustrate the arrangement of information, address signals and other data on the tapes shown in FIGS. 1A and 1B in accordance with known techniques;

DETAILED DESCRIPTION OF ILLUSTRATIVE EMBODIMENTS

Figures 3A, 3B, 4:
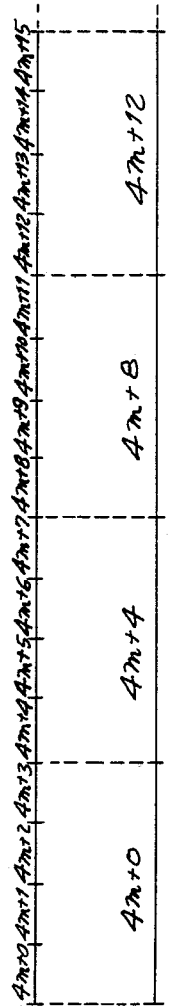
FIGS. 3A and 3B illustrate the relationship of the sector addresses and the information arranged in two differents formats on the tapes shown in FIGS. 1A and 1B, respectively, and an addressing method therefor in accordance with the present invention.
FIG. 4 illustrates in detail the time relation of the sector addresses for the two different formats illustrated in FIGS. 3A and 3B.

The present invention is particularly useful with digital data recording techniques and will be described in that connection in this specification. However, those skilled in the art will readily recognize the possibility of adapting the invention to the recording and reproduction of other kinds of signals. The present invention is thus not limited to the recording and reproduction of digital signals merely because it will be described in that context.

In any case, FIGS. 1A and 1B show two magnetic recording tape configurations suitable for use in the present invention. As will be apparent as this description of the present invention proceeds, the invention is adaptable use with any suitable recording medium, such as magnetic and optical discs and sheets. However, for this description it will be assumed that the magnetic tape is the conventional, longitudinally extending tape which moves relative to fixed recording or reproducing heads. The heads are arranged, in the conventional manner, to record or reproduce a plurality of tracks simultaneously.

FIG. 1A shows a tape 1 with marginal tracks $TA_1$ and $TA_2$ adjacent its opposite edges. These marginal tracks will have analog signals recorded therein. That is, when the tape 1 is used to record digital audio signals, the analog tracks $TA_1$ and $TA_2$ are used to record the corresponding audio signals an analog form. The analog audio signals are useful in locating desired portions of the magnetic tape for use in editing operations, such as so-called splice editing or electronic editing. The tape 1 has tracks TC and TT at its center. The track TC is a control track which will have a control signal recorded therein. The control signal is described in greater detail below. The track TT will have a time code recorded therein. The tape 1 also has data tracks $TD_1$-$TD_{12}$ between the analog track $TA_1$ and the time code track TT. Similarly, there are data tracks $TD_{13}$-$TD_{24}$ disposed between the control track TC and the analog track $TA_2$.

The format used for recording on the magnetic tape 1, which is the first recording medium for the present invention, will be referred to as Format A. In that format each of the data tracks $TD_1$-$TD_{24}$ will have one channel of audio information recorded therein, so that Format A can comprise 24 channels with one data track per channel. The tape speed in Format A will typically be 76 cm/sec and the PCM sampling frequently $f_s$ will be 48 KHz. Other sampling frequences can be used, with the tape speed changing accordingly.

FIG. 1B shows a tape 2 having a total of 12 tracks for recording magnetic signals. At one edge of the tape 2 two tracks $TA_1$ and $TA_2$ are provided for recording analog signals. A track TT is provided at the other edge of the tape for recording a time code therein and a control track TC is located adjacent the time code track TT. Between the analog track $TA_1$ and the control track TC, eight data tracks $TD_1$-$TD_8$ are provided.

The format used for recording on the magnetic tape 2, the second recording medium for the present invention, will be referred to as Format B. In that format each channel of audio information will be simultaneously recorded in four data channels, such as $TD_1$-$TD_4$. The sampling frequency $f_s$ will be the same as in Format A, that is, 48 KHz in this present example, but the tape recording speed is divided by four, and therefore is 19 cm/sec.

In general terms, the present invention is applicable to recording formats in which one format involves the recording of information on a first recording medium in a particular number of tracks per channel and the other format involves the recording on a second recording medium in N times as many tracks per channel as the first medium, generally at a recording speed 1/N times as fast. In the example being used to illustrate the present invention the first medium has one track per channel, is recorded at 76 cm/sec, and N is four. Thus, the second medium has four tracks per channel and is recorded at 19 cm/sec.

Each of the Formats A and B have unique advantages. When more tracks per channel are used, the tape speed is reduced, which reduces tape consumption and provides so-called "long-playing" tapes. However, as tape consumption is reduced and playing time is increased, the number of channels of audio information which can be recorded on the tape is reduced.

FIGS. 2A-2F illustrate a typical example of a digital control signal that is recorded in the control track TC and a typical example of the digitized audio information that is recorded in a typical data track TD. FIGS. 2A and 2B are timing diagrams representative of the control signal; and FIGS. 2C-2F, in combination, are timing diagrams representative of the digitized audio information.

A control signal having the timing representation shown in FIG. 2B is recorded in the control track TC for both formats. The control signal is comprised, in order, of a four-bit synchronizing signal, a 16-bit control word formed of control data bits $C_0$-$C_{15}$, a 28-bit sector address formed of address bits $S_0$-$S_{27}$ and a 16-bit error detecting code word, such as a cyclic redundancy code (CRC) word. Although the control signal shown in FIG. 2B comprises predetermined segments, each of which is formed of a preselected number of bits, other segments with other numbers of bits may be used.

The term "sector" or "sector interval", shown in FIG. 2C, refers to the same predetermined time interval, and the same predetermined amount of space, on both mediums, as explained in detail below. The sector includes the entire 64-bit control signal illustrated in FIG. 2B. Successive control signals are recorded in successive, abutting sector intervals. As each control signal is recorded in a sector inverval, the sector address portion of the control signal is incremented, also as explained in more detail below, in accordance with the present invention. In any case, the sector addresses serve to identify the particular sector interval in which the control signal is recorded. A desired sector inverval thus can be found merely by finding the corresponding sector address. Since the sector address segment of the control signal comprises 28 bits, up to $2^{28}$ successive sector intervals may be recorded on a length of magnetic tape.

The synchronizing signal that precedes the control word portion of the control signal is illustrated with an expanded time scale in FIG. 2A. The synchronizing signal occupies the space of four control signal bit cells, wherein a bit cell is the interval occupied by a bit of the control word, the sector address or the CRC code. The synchronizing signal exhibits a predetermined, constant synchronizing pattern preceded by a "preamble". The synchronizing pattern is included in the synchronizing signal and follows the preamble. The synchronizing signal exhibits a positive-going transition at a period 1T' following the preamble, and then exhibits an opposite, negative-going transition at a period 1.5T following first-mentioned positive-going transition. The synchronizing signal ends, and the control word commences, at a period 1T' following this second, negative-going transition. This particular synchronizing pattern is advantageous for reasons set forth in detail in the above-cited patent application.

The control word is adapted to represent control data for the purpose of identifying the particular format that is used to record the digitized information. For example, control bits $C_{12}$–$C_{15}$ may represent the sampling rate that has been used to digitize the analog signal, resulting in the digitized information being recorded. Alternatively, since the speed at which the record medium is driven is related to the sampling rate, control bits $C_{12}$–$C_{15}$ may represent this tape speed. Control bits $C_9$–$C_{11}$ represent the number of tracks per channel in which each channel of digitized information is recorded. In Format A each channel of digitized information is recorded in a respective data track. In Format B each channel of digitized information is recorded in four separate data tracks. Control bits $C_0$–$C_8$ are used to represent other characteristics of the recording techniques used. For example, different encoding schemes, such as a cross-interleave code, can be used to encode the digitized information. Modifications of the cross-interleave code can also be used. Different modulation techniques are also used in recording the digitized information. The control bits $C_0$–$C_8$ are reserved for identifying all of those particular characteristics. Thus, the control word, comprised of bits $C_0$–$C_{15}$, represents the particular techniques used to sample, encode, modulate and record the input information.

The control word data and the sector address data are used to produce an appropriate CRC code, or other error detecting code, from which the presence of errors in the control word and sector address may be detected upon reproduction. The formation of a CRC code and the manner in which it is used are conventional.

FIG. 2C is a representative timing diagram illustrating the manner in which digitized information is recorded in a respective data track TD in a one track per channel format (that is, Format A).

In accordance with cross-interleave error correction encoding techniques, successive samples of an input analog signal, such as an audio signal, are converted to corresponding digital information words, and those digital information words are used to produce error-correction words, such as P-parity words. Then, a predetermined number of information words and P-parity words are time-interleaved to form sub-blocks, and a further error-correction word, such as a Q-parity word, is derived from the time-interleaved sub-block. Odd and even information words and their respective P-parity and Q-parity words are cross-interleaved to form a data block comprising, for example, twelve information words, four parity words and an error-detection word, such as a CRC code word, derived therefrom. Each data block also includes a data synchronizing signal and, as illustrated in FIG. 2C, four successive data blocks are recorded in a sector interval.

When Format A is used, in which the digitized information is recorded in one track per channel, successive data blocks are recorded sequentially in one data track TD. When the digitized information is recorded in Format B, in which four tracks per channel are used, the four data tracks are provided with the data blocks shown in FIG. 2C in a manner shown schematically in FIG. 3B and described in detail below.

Nevertheless, regardless of format, or number of tracks per channel, each data track has data blocks recorded therein generally as shown in FIG. 2C. Thus, during each sector interval, four successive data blocks are recorded in a channel. Advantageously, the control signal recording head is in proper alignment with the information signal recording heads such that all of the tracks are in alignment across the width of the magnetic medium. In other words, all of the synchronizing signals are in alignment, and the information signals in the data tracks TD are in alignment with the control signal recorded in the control track TC. The synchronizing signal which is recorded at the head of the control signal is thus in alignment with the data synchronizing signals of the first data blocks recorded in a particular sector interval.

The data synchronizing signal included at the beginning of each data block (shown by the cross-hatched areas in FIG. 2C) is illustrated with an expanded time scale in FIGS. 2D and 2E. The data synchronizing signal occupies an interval corresponding to sixteen data bit cells, wherein each data bit cell is equal to the duration of the recorded data bit. The duration of a data bit cell T is much smaller than the duration of a control bit cell T', for example, T'=18T. The data synchronizing pattern is selected to be unique in that it will not be exhibited by the information data included in the respective data blocks. Consequently, the data synchronizing signal may be readily detected upon reproduction and used, for example, to restore timing, to detect the beginning of a data block, to synchronize the demodulation and decoding of the digitized information, and the like. Additional information regarding the data synchronizing pattern can be found in the above-cited U.S. patent application.

The data synchronizing pattern of the data synchronizing signal is followed, after a delay interval of 0.5T, by a block address comprised of bits $B_0$–$B_2$ which, in turn, is followed by two flag bits $F_{B1}$ and $F_{B0}$. The block address [$B_2B_1B_0$] identifies the particular block position in which the associated data block is recorded. Preferably, the most significant bit $B_2$ of the block address is made equal to the least significant bit $S_0$ of the sector address of the particular sector in which the data block is recorded. Since the block address is comprised of three bits, eight separate block positions may be represented thereby. Since four data blocks are recorded end-to-end in a sector interval, and since the most significant block address bit $B_2$ is made equal to the least significant sector address bit $S_0$, the block address [$B_2B_1B_0$] is repeated every two sector intervals. That is, eight separate block positions are recorded during every two sector intervals. If the most significant block address bit $B_2$ is equal to a binary "1", as determined by the least significant sector address bit $S_0$, then the data synchronizing signal shown in FIG. 2D is recorded. Alternatively, if the most significant block address bit $B_2$ is equal to a binary "0", then the data synchronzing signal illustrated in FIG. 2E is recorded.

The flag bits $F_{B1}$ and $F_{B0}$ can be used, for example, as an emphasis identification signal. Preferably, when digital audio signals are recorded, the original analog audio signals are selectively subjected to emphasis prior to being digitized. If such analog signals are emphasized, that is, if a conventional emphasis circuit is actuated or "turned on", then the emphasis identification signal represents that the analog signal had been emphasized. Additional features of the data synchronizing pattern are described in the above-cited application.

In any case, as illustrated in FIGS. 2D and 2E, the data synchronizing signal is a 16-bit interval which, in turn, corresponds to the duration of an information or parity word.

The information portion of each data block is illustrated with an expanded time scale in FIG. 2F. Each information word $W_1$-$W_{12}$ is 16-bits and each is derived from a respective sample of the input analog signal. In addition to the information words $W_1$-$W_2$, each data block also includes odd and even P-parity words $P_O$ and $P_E$, respectively, and odd and even Q-parity words $Q_O$ and $Q_E'$, respectively. The odd and even information and parity words are cross-interleaved in accordance with error-coding techniques. In addition, an error detecting word, such as a 16-bit CRC code word, is produced in response to the information and parity words, and the block address bits $B_0$-$B_2$ and the flag bits $F_{B0}$-$F_{B1}$.

FIGS. 3A and 3B illustrate the relationship between the recording Formats A and B, respectively, wherein each channel of digitized information is recorded in one data track (Format A) or in four data tracks (Format B). Thus, in Format A, as shown in FIG. 3A, successive data blocks are recorded in a single data track. In Format B, as shown in FIG. 3B, successive data blocks are distributed in data tracks $TD_A$, $TD_B$, $TD_C$ and $TD_D$.

In FIGS. 3A and 3B the expression "data sequence" refers to the successive data blocks in a particular analog signal channel, and the expression "block address" (the value given by the bits $B_0$-$B_2$ shown in FIG. 2E) refers to the block in which that particular data block is recorded in a particular data track. The "sector address" is the value given by the bits $S_0$-$S_{27}$ in the control signal shown in FIG. 2B. Furthermore, the expressions "n" and "m" are integers. Accordingly, when Format A is adopted, the first data block (n) is recorded in block 0 of, for example, the first sector interval (with the sector address 4m+0). The second data block (n+1) is recorded in block 1 of this sector interval, and so on. In the second sector interval with the sector address 4m+1, the fifth data block (n+4) is recorded in block 4, the sixth data block (n+5) is recorded in block 5, and so on. At the next-following sector interval, with the sector address (4m+2), the blocks repeat. The last data block shown, the seventeenth (n+16), begins a sector interval with the sector address 4m+4.

When Format B is adopted, as shown in FIG. 3B, the successive data blocks are distributed in the data tracks $TD_A$, $TD_B$, $TD_C$ and $TD_D$. Thus, the first data block (n) is recorded in block 0 of the track $TD_A$, the second data block (n+1) is recorded in block 0 of the track $TD_B$, the third data block (n+2) is recorded in block 0 of the track $TD_C$ and the fourth data block (n+3) is recorded in block 0 of the track $TD_D$. This sequence of distribution of the data blocks continues, so as to record the data blocks in respective block numbers of the tracks $TD_A$-$TD_D$, as illustrated. When the second-following sector interval is reached, the block addresses in each of the tracks $TD_A$-$TD_D$ repeat. Note that the sector address 4m=4 identifies a sector interval beginning with the seventeenth data block (n+16).

Information is recorded in Format A with a particular recording wavelength, so that each data block occupies a predetermined amount of space L on the recording medium, here the magnetic tape 1. In Format B, as described above, the same sampling frequency $f_s$ is used in generating the digitized PCM information signal. However, the tape speed is reduced from Format A so that it is 1/N, where N is four in the present embodiment. The recording wavelength is the same in Format B as in Format A, so that each data block in Format B also occupies the same amount of space L on the tape, in a conventional manner.

To understand how the data blocks in different formats occupy the same amount of space on the tapes, a feature which is advantageously used by the present invention, consider first the recording of information in Format A. Four data blocks contain X bits of information (see FIGS. 2C–2F; here X=1152=17 words of 16 bits each plus a 16 bit data synchronizing signal in each data block, times four). Thus, at a given sampling frequency $f_s$, a given duration t of the analog signal will be required to create X bits. At a given tape recording speed $R_A$ and at a given recording wavelength $w_A$, those X bits will occupy a space on the tape X $w_A$=$R_A$ t. Because each data block comprises X/4 bits, each data block occupies a space $L_A$=$w_A$ X/4=t $R_A$/4.

Now, assume that a sample of the analog signal having the same duration t is to be recorded in Format B in N=4 tracks. At the same sampling frequency $f_s$, the same number X bits, representative of the analog signal, are generated. Because those bits are to be simultaneously recorded in four tracks, they are "held" as they are being generated until all X bits have been generated and are then arranged for simultaneous recording by four recording heads. Thus, each head will record X/N (or X/4 here) bits in each track in time t. It is desirable to record the bits in a time equal to the time of the analog signal they represent; that way the recording of the $X_1$ bits for one time interval $t_1$ can be taking place during the holding and arranging operation for the next $X_2$ bits for the following time $t_2$. If $w_B$ is the recording wavelength in Format B and $R_B$ is the recording speed, then the space $L_B$ in each track on the tape occupied by the X/4 bits is $W_B$ X/4 =$R_B$ t. If the recording wavelengths are the same (that is, $w_A$=$w_B$=w), then the length of tape occupied for that duration of the analog signal is ¼ of that in Format A. Put another way, if the recording speed $R_B$=$R_A$/N=$R_A$/4, then $L_B$=t $R_B$=t $R_A$/4=$L_A$.

Thus, as FIGS. 3A and 3B show, each data block, whether recorded in Format A or Format B, takes the same amount of space L in each data track. In more general terms, if the number of tracks in Format B is N times the number of tracks in Format A, then the recording speed in Format B is 1/N times that in Format A. That relationship results in a series of data blocks that occupy the same amount of space L in each track on both mediums. An inherent feature of that relationship is that the recording wavelengths are the same.

FIGS. 3A and 3B illustrate how the present invention takes advantage of that relationship to provide an advantageous addressing scheme that allows more convenient synchronization of the reproduction of the information on two or more recording mediums. The sector addresses on the tape recorded in Format A (see also FIGS. 2A and 2B) are incremented by one for each four data blocks associated with the particular sector interval. In Format B, in the conventional addressing scheme described in the above-cited patent application, the sector addresses in Format B were also incremented by one for each succeeding sector interval. However, in accordance with the present invention the sector addresses in Format B are incremented by four in each succeeding sector interval. Thus, succeeding sectors in Format B begin with the sixteenth data sequence following the data sequence that began the previous sector and succeeding sector addresses are incremented by four, as pointed out above. In Format A the sixteenth data sequence following a data sequence that began a previous particular sector begins a sector with an address also incremented by four over the address of that previous particular sector.

In more general terms, the first recording medium has a series of first sector addresses, each of which has a value different from that in the adjacent sector by an amount I. In the present embodiment, the sector addresses are digital and I=1. The second recording medium has a series of sector addresses each of which has a value different from that in the adjacent sector by an amount N times I (here, 4).

FIG. 4 demonstrates that the sector addresses, shown in relation to the same time axis t, can be conveniently used to synchronize the reproduction of the information signals from the tapes. Since the tape 1 is played back four times faster than the tape 2, the sector addresses pass the reproducing heads at the same rate. For example, if the playback head is at 4m+0 on both tapes at time t=0, then sector address 4m+4 on the tape will reach the playback head at $t=t_{SA}=16L/R_A$. On the other hand, the tape 2 is played back at $R_B=R_A/4$. The sector address 4m+4 on the tape 2 will reach those playback heads at $t_{SB}=4L/R_B=16L/R_A=t_{SA}$ or, in other words, at the same time. Thus, any particular relationship can be maintained between the information being reproduced from the two tapes. That is, the term "synchronize" as applied to the present invention refers to maintaining that relationship, not necessarily just to reproducing the same signal from both tapes at the same time. If it is desired to synchronize the playback of the tape 1 from, say, a sector address of 300 with the playback of the tape 2 from a sector address of 100, it is only necessary to maintain the difference between the two sector addresses constant.

Figure 5:
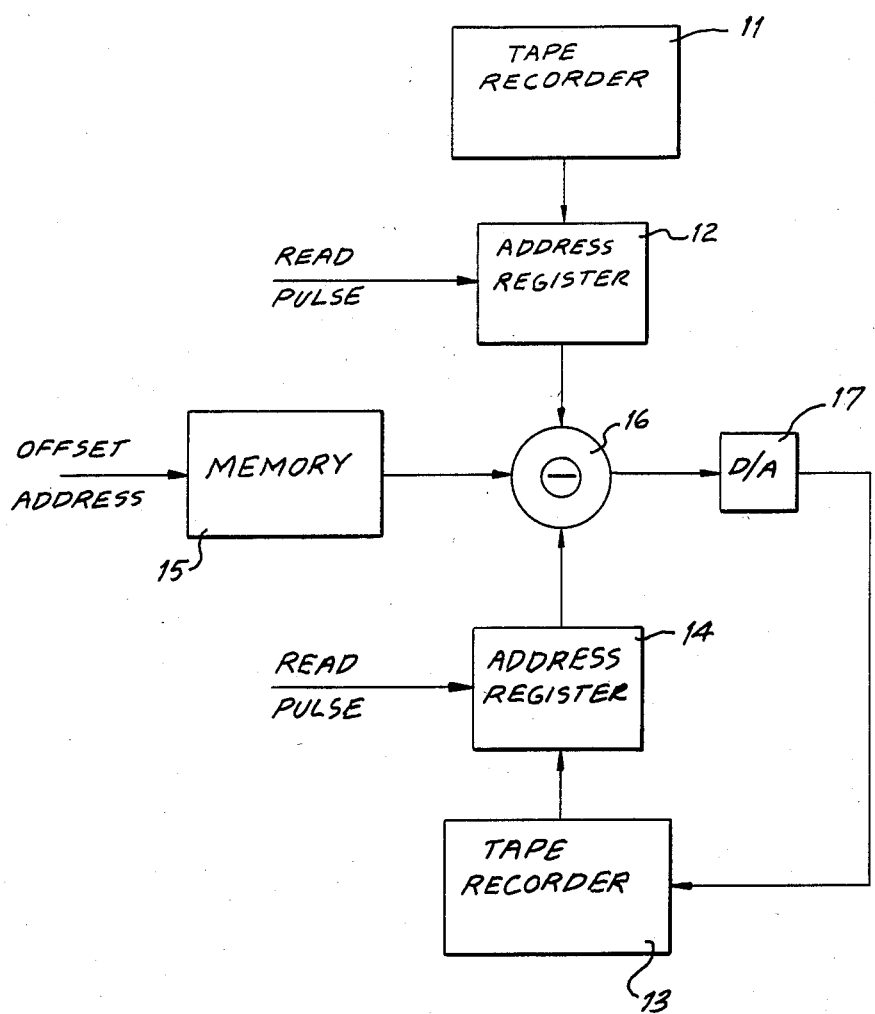
FIG. 5 illustrates an apparatus for providing synchronized reproduction of information recorded on two tapes in formats like those shown in FIGS. 3A and 3B.

FIG. 5 schematically illustrates an embodiment of an apparatus that uses the addressing method of the present invention to synchronize the reproduction of information from two tapes. A first tape recorder 11 reproduces at the speed $R_A$ the signals on the tape 1, including the control track. The sector addresses in the control track are fed to a first register circuit 12. A second tape recorder 13 reproduces the tape 2. The second tape recorder 13 has a "nominal" speed of $R_B$, but is controlled to synchronize the playback of the tapes in a manner described in detail below. The second tape recorder 13 feeds the sector addresses from the tape 2 into a second register circuit 14.

The register circuit 12 and 14 convert the sector addresses, read from the tapes in serial form, into a parallel form, in which they represent the digital sector address for use in accordance with the present invention. Read pulses are applied to the registers at appropriate times to read out the sector addresses, as explained below.

A memory circuit 15 stores the predetermined difference between the sector addresses that is to be maintained so that the playback of the tapes 1 and 2 is synchronized. The difference, or offset address, is input to the memory circuit 15.

A subtraction circuit 16 receives the first and second sector addresses from the address registers 12 and 14 and the offset address from the memory circuit 15. If the first sector address is a, the second sector address is b and the offset address is c, the subtraction circuit operation can be expressed as a-b-c. Thus, the subtraction circuit 16 determines a first difference between the sector addresses and then subtracts from it the predetermined difference represented by the offset address. That operation results in a digital difference signal that is fed to a digital-to-analog converter 17, which converts the difference signal into an analog servo signal, the level and sense of which depend on the magnitude and sign of the digital difference signal. The analog servo signal is fed to a motor speed control in the second tape recorder 13.

In general, the two tape recorders 11 and 13 comprise reproducing means that reproduce information and sector addresses from both tapes, with the playback speed of one recorder being substantially N times as fast as the other. The two registers 12 and 14, the memory circuit 15 and the subtraction circuit 16 comprise comparing means for comparing the addresses from both tapes and determining the difference between them. The digital-to analog converter 17 is a servo control means that adjusts the speed of the tape recorder 13.

The operation of the synchronizing apparatus shown in FIG. 5 begins with supplying an offset address to the memory circuit 15. As in the above example, assume that the information signals are to be reproduced in synchronization with an offset address of 200, beginning at a sector address of 300 on the first tape 1 and a sector address of 100 on the second tape 2. The offset address of 200 is stored in the memory circuit 15.

The tape recorders 11 and 12 are placed in a fast forward mode and their tachometers are made operative to sense the approach of the respective end points from which synchronization is to begin. The tachometers use the sector addresses in the conventional manner. When both sector addresses, that is, 300 on the first tape 1 and 100 on the second tape 2 are reached, the synchronization circuit in FIG. 5 is made operative.

The tape recorders 11 and 12 are put in their normal playback modes while the sector addresses are being read. As the sector addresses are being read they are converted to parallel form in the registers 12 and 14. The first register 12 receives a read pulse at each fourth sector address. The read pulse can be generated by suitable circuitry (not shown) in response to a count of recurring signals on the tape, such as the control signal's synchronizing pattern. In any case, every fourth sector address from the tape 1 is supplied to the subtraction circuit 16. With the tape recorder 13, every sector address from the tape 2 is read from the second register 14 into the subtraction circuit 16.

The subtraction circuit 16 subtracts from the first sector addresses (a) the second sector addresses (b) and subtracts from that difference the offset address (c). If a is greater than b by, say, 201, then a-b-c=1. In terms of tape speed, that indicates that the second tape recorder 13 is going too slow. The digital-to-analog converter 17 produces an analog error signal, such as a d.c. voltage, which has a magnitude that will change the speed of the tape recorder 13 just enough to bring it back into synchronization with the first tape recorder 11 and a sense, say positive, that causes an increase in the playback speed of tape 2. If "a" were more than "b" by, say 198, then the output of the subtraction circuit 16 would be −2, which would produce a negative d.c. voltage large enough to slow down the second tape recorder 13 to bring the output of the subtraction circuit back to zero.

The synchronizing circuit in FIG. 5 thus automatically restores synchronization of the tapes 1 and 2, which can be lost for various reasons, one example being tape slippage.

Those skilled in the art will appreciate that the present invention is not limited to use with two tapes. The playback of three or more tapes can be synchronized if the relationships set out above are maintained. For example, a third tape could be recorded in a format having two tracks for each analog channel and its playback could be synchronized with either or both of the first two tapes.

The above description of an illustrative embodiment of the present invention assumes that the playback speed and recording speed of the respective tapes is to be identical, which probably will be the case in most instances. However, those skilled in the art will recognize from the above description that the present invention can be used even if that relationship between recording and reproducing speeds is not maintained.

The present invention has been described in connection with an illustrative embodiment. Those skilled in the art will recognize modifications other than those specifically mentioned which can be made to that embodiment without departing from the spirit of the invention. Thus, the scope of the invention is defined solely by the claims which follow.

What is claimed is:

1. A method of addressing information recorded on first and second recording mediums in a plurality of tracks, said information being arranged in each said track in sequentially arranged blocks each occupying a predetermined amount of space L on each of said mediums, said second medium having an integral number N times as many of said tracks as said first medium in which said information has been recorded and from which said information is to be reproduced at a speed 1/N times as fast as reproduction from said first medium, N being greater than 1, the method comprising:
   providing said first and second mediums with pluralities of first and second sequentially arranged sectors, respectively, identifying sequential spaces on said mediums parallel to said tracks, each said sector occupying an amount of space substantially equal to an integral multiple of L;
   assigning a first sector address to each said first sector, each said first sector address having a value different from the adjacent first sector address by a predetermined amount I; and
   assigning a second sector address to each said second sector, each said second sector address having a value different from the adjacent second sector address by a predetermined amount substantially equal to N times I.

2. A method as in claim 1; wherein:
   said recording mediums are longitudinally extending magnetic tapes; and
   said first tape has been recorded at a speed substantially N times as fast as said second tape; and
   said blocks extend longitudinally along said tapes, with said blocks in adjacent tracks being substantially aligned with each other in the direction transverse to the longitudinal direction of the respective tape.

3. A method as in claim 2; wherein said first and second sector addresses are in digital form.

4. A method as in claim 3; wherein said first tape has one track, N is four, I is one and each said sector occupies a space substantially equal to L times four.

5. A method as in claim 3; wherein the information on said tapes is in digital form.

6. A method of synchronizing the reproduction of information from first and second recording mediums having information recorded thereon in sequentially arranged blocks in a plurality of tracks, each said block occupying a predetermined amount of space L on each of said mediums, said second medium having an integral number N times as many of said tracks as said first medium in which said information has been recorded, N being greater than 1, the method comprising:
   providing each of said first and second mediums with a plurality of first and second sequentially arranged sectors, respectively, identifying sequential spaces on said mediums parallel to said tracks, each said sector occupying an amount of space substantially equal to an integral multiple of L;
   providing a first sector address on said medium for each said first sector, each said first sector address having a value different from the adjacent first sector address by a predetermined amount I;
   providing a second sector address on said second medium for each said second sector, each said second sector address having a value different from the adjacent second sector address by a predetermined amount substantially equal to N times I;
   reproducing information and said first sector addresses from said first medium at a first playback speed;
   reproducing information and said second sector addresses from said second medium at a second playback speed; and
   maintaining a predetermined difference between said first and second sector addresses being reproduced so that said first playback speed is maintained N times faster than said second playback speed and said reproduced information from said first and second mediums is maintained with a predetermined relationship therebetween.

7. A method as in claim 6; wherein said sector addresses are in digital form, the method further comprising the steps of:
   determining the actual difference between said first and second sector addresses being reproduced; and
   comparing said actual difference and said predetermined difference and providing an error signal to adjust at least one of said first and second playback speeds, the value of said error signal representing the deviation of said actual difference from said predetermined difference.

8. A method as in claim 7; further comprising the step of storing said predetermined difference for comparison with said actual difference.

9. A method as in claim 7; wherein said recording mediums are longitudinally extending magnetic tapes, said first tape has been recorded at a speed substantially N times as fast as said second tape and said blocks extend longitudinally along said tapes, and wherein said blocks in adjacent tracks are substantially aligned with each other in the direction transverse to the longitudinal direction of the respective type.

10. A method as in claim 9; wherein said first tape has one track, N is four, I is one and each sector occupies a space substantially equal to four times L.

11. A method as in claim 9; wherein the information in said tapes is in digital form.

12. A method as in claim 7; wherein for synchronizing the reproduction of information beginning at first and second predetermined sector addresses on said first and second mediums, respectively, the method further comprises the step of positioning said mediums so that the information associated with said first and second predetermined sector addresses is disposed at means for reproducing the information from said mediums.

13. Apparatus for synchronizing the reproduction of information from a first and second recording mediums having information recorded thereon in sequentially arranged block in a plurality of tracks, each said block occupying a predetermined amount of space L on each of said mediums, said second medium having an integral number N times as many of said tracks as said first medium in which said information has been recorded, N being greater than 1, each medium having a plurality of first and second sequentially arranged sectors, respectively, identifying sequential spaces on said medium parallel to said tracks, each sector occupying an amount of space substantially equal to an integral multiple of L and being addressed by first and second sector addresses, respectively, with each said first sector address differing from the adjacent first sector address by a predetermined amount I and each said second sector address differing from the adjacent second sector address by an amount substantially equal to N times I, the apparatus comprising:

reproducing means for reproducing information and said first and second sector addresses from said mediums at a first playback speed for said first medium substantially N times as fast as a second playback speed for said second medium;

comparing means for comparing said reproduced first and second sector addresses and determining the difference therebetween; and servo control means for adjusting said first and second playback speeds relative to each other in response to a deviation of said difference between said first and second sector addresses from a given value.

14. Apparatus as in claim 13; wherein said sector addresses are in digital form, said recording mediums are longitudinally extending magnetic tapes, said first tape has been recorded at a speed N times as fast as said second tape, said blocks extend longitudinally along said tapes with blocks in adjacent tracks being substantially aligned, relative to each other in a direction transverse to a longitudinal direction of the respective tape and said comparing means includes:

memory means for memorizing a predetermined difference between said sector addresses;

a first register means for converting each said first sector address sequentially reproduced from said first tape into said digital first sector address;

a second register means for converting each said second sector address sequentially reproduced from said second medium into said digital second sector address; and subtraction means for determining a first difference by subtracting said first and second digital addresses and determining a second difference by subtracting said predetermined difference from said first difference.

15. Apparatus as in claim 14; wherein said servo control means includes a digital-to-analog converter for producing an analog error signal representative of said second difference by converting said digital second difference into analog form.

16. Apparatus as in claim 15; wherein said reproducing means includes a first tape reproducing apparatus for playing back said first tape substantially at a first speed and a second tape reproducing apparatus for playing back said second tape substantially at a second speed 1/N times as fast as said first speed, and said analog error signal adjusts the speed of at least one of said first and second tape reproducing apparatus.

17. Apparatus as in claim 16; wherein for synchronizing the reproduction of information from said first tape beginning at a predetermined first sector address and from said second tape beginning at a predetermined second sector address;

said first tape reproducing apparatus is operable in a fast forward mode until said predetermined first sector address is reached; and said second tape reproducing apparatus is operable in a fast forward mode until said predetermined second sector address is reached.

18. Apparatus as in claim 14; wherein the information on said tapes is in digital form.

* * * * *